United States Patent [19]

Tershansy et al.

[11] 3,907,754

[45] Sept. 23, 1975

[54] PROCESS AND CATALYST-INHIBITOR SYSTEM FOR PREPARING SYNTHETIC LINEAR POLYESTER

[75] Inventors: Ronald A. Tershansy; Nicholas C. Russin; Finley E. McFarlane, all of Kingsport, Tenn.

[73] Assignee: Eastman Kodak Company, Rochester, N.Y.

[22] Filed: June 19, 1974

[21] Appl. No.: 480,776

[52] U.S. Cl. ............................................. 260/75 R
[51] Int. Cl.² ........................................... C08G 63/04
[58] Field of Search ................................. 260/75 R

[56] References Cited
UNITED STATES PATENTS
2,641,592   6/1953   Holrichter............................ 260/75

FOREIGN PATENTS OR APPLICATIONS
28,119   7/1972   Japan

Primary Examiner—Melvin Goldstein

[57] ABSTRACT

Catalyst-inhibitor system for the polymerization of poly(ethylene terephthalate) having excellent properties for fabrication of fibers and films. The catalyst-inhibitor system comprises a combination of organic or inorganic salts of manganese and cobalt with acetyl triisopropyl titanate and a phosphate ester. This invention also is directed to an improved method of preparing synthetic linear polyesters utilizing the new catalyst-inhibitor system.

6 Claims, No Drawings

PROCESS AND CATALYST-INHIBITOR SYSTEM FOR PREPARING SYNTHETIC LINEAR POLYESTER

This invention relates to an improved method for preparing a synthetic linear polyester and a new and improved catalyst-inhibitor system.

Poly(ethylene terephthalate) may be derived from a process comprising carrying out an ester interchange between ethylene glycol and dimethyl terephthalate to form bis-2-hydroxy ethyl terephthalate which is polycondensed to poly(ethylene terephthalate) under reduced pressure and at elevated temperatures.

Difficulties have been encountered in the manufacture of polyethylene terephthalate by the ester interchange reaction. Obviously, highly purified dimethyl terephthalate and highly purified glycol are preferred starting materials in order to form a uniform high quality product. However, even these highly purified materials are very sluggish with respect to ester interchange and in the case of less purified materials the reaction is too slow for practical commercial operation. Because of this slow rate of reaction it has been found essential, in commercial operation, to employ a suitable catalyst to speed up the reaction.

Many catalysts have heretofore been proposed for the ester interchange reaction in the manufacture of polyethylene terephthalate. These catalysts have not proven to be entirely satisfactory since fibers and filaments produced from the condensation polymers using said heretofore known catalysts do not possess the desired whiteness or lack of color. Therefore, there has been a great need in the art to find a catalyst system which not only speeds up the reaction into the realm of that considered necessary for economic purposes and which is useful over approximately the entire range of molecular weights desired in the finished polymer, but also, a catalyst which produces a condensation polymer of good color.

Accordingly, it is an object of this invention to provide a new and improved process for producing poly(ethylene terephthalate) which overcomes the disadvantages of prior art processes, pointed out hereinbefore, and produces a product of improved properties at a fast rate of reaction.

It is another object of this invention to provide a new catalystinhibitor system which accelerates ester interchange and polycondensation and produces poly(ethylene terephthalate) having excellent color.

Other objects and advantages of the present invention will be apparent from the description thereof hereinafter.

The catalyst system for the production of poly(ethylene terephthalate) comprises, in combination, salts of manganese and cobalt with acetyl triisopropyl titanate and a phosphate ester. The salts preferred are manganous benzoate tetrahydrate and cobaltous acetate tetrahydrate. The preferred phosphate ester has the formula

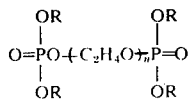

wherein $n$ has an average value of about 1.5 to about 3.0 and each R is hydrogen or an alkyl radical having from 6 to 10 carbon atoms, the ratio of the number of R groups of hydrogen atoms to the number of phosphorus atoms being about 0.25 to 0.50, and the ester has a free acidity equivalent of about 0.2 to 0.5. The components of the system are present in catalyst metal levels of 5–35 ppm Co; 35–110 ppm Mn; 36–72 ppm Ti; and 550–1600 ppm of the phosphate ester, based on the acid fraction of the poly(ethylene terephthalate).

The objects of the present invention are accomplished by conducting the ester interchange reaction between dimethyl terephthalate and ethylene glycol in the presence of a catalytic amount of a combination of organic or inorganic salts of manganese and cobalt with acetyl triisopropyl titanate and subsequently adding a phosphate ester before polycondensation of the product of the ester interchange reaction. Examples of suitable manganese salts are manganous benzoate tetrahydrate, manganese chloride, manganese oxide, manganese acetate, manganese acetylacetonate, manganese succinate, manganese diethyldithiocamate, manganese antimonate, manganic phosphate monohydrate, manganese glycoloxide, manganese naphthanate and manganese salicyl salicylate. Examples of suitable cobalt salts are cobaltous acetate tetrahydrate, cobaltous nitrate, cobaltous chloride, cobalt acetylacetonate, cobalt naphthanate and cobalt salicyl salicylate.

In the preparation of polyethylene terephthalate, by means of the ester-interchange reaction, the process comprises two steps. In the first step, ethylene glycol and dimethyl terephthalate are reacted at elevated temperatures and atmospheric pressure to form bis-2-hydroxyethyl terephthalate (BHET) and methanol, which is removed. Thereafter the BHET is heated under still higher temperatures and under reduced pressure to form polyethylene terephthalate with the elimination of glycol, which is readily volatilized under these conditions and removed from the system. The second step, or polycondensation step, is continued until a fiber-forming polymer having the desired degree of polymerization, determined by inherent viscosity, is obtained. Without the aid of a suitable catalyst, the above reactions do not proceed at a noticeable rate.

Inherent viscosity is determined by measuring the flow time of a solution of known polymer concentration and the flow time of the polymer solvent in a capillary viscometer and then by calculating the inherent viscosity using the equation:

$$\text{Inherent Viscosity (I.V.), } n \begin{array}{c} 25°C. \\ 0.50\% \\ \text{PTCE} \end{array} = \frac{\ln \frac{t_s}{t_o}}{C}$$

where:
ln = Natural logarithm
$t_s$ = Sample flow time
$t_o$ = Solvent blank flow time
C = Concentration in grams per 100 ml. of solvent
PTCE = 60% phenol, 40% tetrachloroethane The basic method is set forth in ASTM D2857-70.

The method used for calculating catalyst metal concentrations in poly(ethylene terephthalate) for purposes of this specification may be illustrated as follows. The poly(ethylene terephthalate) is prepared in 0.60 gram mole batches. The polymer's repeat unit empirical formula is $C_{10}H_8O_4$, and its gram molecular weight thus is 192.16 g. A 0.60 mole batch is, therefore, 115.30 g. A 0.60 mole batch of polymer requires 0.60 mole of terephthalic acid or its alkyl esters such as dimethyl terephthalate (DMT; mol. wt. = 194.19). Thus, 0.60 mole of this "acid fraction" as DMT is determined to be:

0.60 mole × 194.19 g./mole = 116.51 g.

Catalyst metals levels are reported in parts by weight of metal per million parts by weight of DMT. Thus, 48 ppm Ti is determined as $$0.60 \text{ mole} \times \frac{194.19 \text{ g./mole}}{1,000,000} \times 48 = 0.00559267 \text{ g. Ti}$$

The weight of other catalyst metals or other additives is calculated similarly.

This invention involves conducting the ester interchange reaction in the presence of a catalyst system comprising a mixture of acetyl triisopropyl titanate and organic or inorganic salts of manganese and cobalt. The manganese salts should be present in the amount of 35–110 parts per million manganese; the cobalt salts should be present in the amount of 5–35 parts per million cobalt; and the acetyl triisopropyl titanate should be present in the amount of 36–72 parts per million titanium. All parts by weight are based on the acid fraction of the polymer weight to be produced. The preferred manganese salt is manganous benzoate tetrahydrate and the preferred cobalt salt is cobaltous acetate tetrahydrate.

After the ester interchange reaction a phosphate ester is added to the reaction product and the reaction product is polycondensed. The preferred phosphate ester has the formula

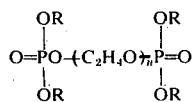

wherein $n$ has an average value of 1.5 to about 3.0 with about 1.8 being most preferred and each R is hydrogen or an alkyl radical having from 6 to 10 carbon atoms with octyl being most preferred, the ratio of the number of R groups of hydrogen atoms to the number of phosphorus atoms being about 0.25 to 0.50 with about 0.35 being most preferred; and the ester having a free acidity equivalent of about 0.2 to 0.5, the ester being present in the amount of 550–1600 parts per million based on the acid fraction of the polyester to be produced. It is further preferred that the phosphate ester has a molecular weight of 771 and that the composition be: C = 52.84%; H = 9.98%; P = 8.04%; and O = 29.14% by weight.

The process and catalyst-inhibitor system of this invention provides for the manufacture at high production rates of high quality poly(ethylene terephthalate) polyester having excellent properties for the fabrication of fibers and films. Poly(ethylene terephthalate) produced in accordance with this invention has excellent color (whiteness), low concentration of diethylene glycol (ether linkages) as set forth in Examples 7 and 8 in Table 1, excellent stability against thermooxidative, hydrolytic, and ultraviolet radiation degradation effects, as set forth in Example 16 in Table 2, and when melt spun into fibers or filaments results in essentially no deposits on spinneret faces. Further, the system of this invention has been found to be highly active in that when used to produce poly(ethylene terephthalate) by a continuous melt phase process, the attainable production rates are about 3–10% higher than for other catalyst systems as, for example, zinc or manganese ester interchange catalyst in combination with antimony polycondensation catalyst or a magnesium-titanium-butoxide Meerwein catalyst or acetyl triisopropyl titanate alone where in each case phosphate esters are added either before or after the ester interchange reaction and prior to the polycondensation reaction (see Example 17).

The data set forth in the following examples illustrate these effects.

The invention will be further illustrated by the following examples although it will be understood that these examples are included merely for purposes of illustration and are not intended to limit the scope of the invention.

Table 1

Properties of Poly(ethylene terephthalate) Made with Various Catalyst Systems

| Example | Catalyst System (ppm[1]) | I.V.[2] | % DEG[3] | CEG[4] | CDM Color[5] |
|---|---|---|---|---|---|
| 1 | (65)Zn-(230)Sb-(31)P | .60 | 1.08 | 29 | 1.9 |
| 2 | *(48)Ti-(62)P | .72 | 1.30 | 25 | 4.9 |
| 3 | (12)Mg-(48)Ti-(62)P | .72 | 0.67 | 17 | 5.2 |
| 4 | **(48)Ti-(62)P | .62 | 1.18 | 20 | 4.7 |
| 5 | (236)Mn-(374)Sb-(44)P | .64 | 0.70 | 24 | 5.1 |
| 6 | **(50)Mn-(48)Ti-(50)P | .71 | 0.62 | 13 | 6.5 |
| 7 | **(50)Mn-(60)Ti-(20)Co-(80)P | .58 | 0.52 | 8 | 3.1 |
| 8 | **(70)Mn-(60)Ti-(20)Co-(80)P | .61 | 0.50 | 20 | 2.6 |

*Ti as titanium tetraisopropoxide.
**Ti as acetyl triisopropyl titanate.
[1]Ppm metal based on polyester acid fraction.
[2]Inherent viscosity of 0.5 g./100 ml of 60/40 (w/w) phenol/tetrachloroethane at 25°C.
[3]Diethylene glycol wt. percent.
[4]Carboxyl end groups milliequivalents/Kg.
[5]Yellowness value determined by Gardner Color Difference Meter.

The poly(ethylene terephthalate) shown in Examples 1–8 of Table 1 were prepared as follows in Examples 1–8 respectively:

EXAMPLE 1

65 Zn-230 Sb-31 P Catalyst

A 10 mole ester interchange reaction was run by weighing 1942 g. (10.0 moles) dimethyl terephthalate (DMT) and 1390 g. (22.4 moles) ethylene glycol (EG)

into a 5000 ml reactor flask equipped with a mechanical stirrer, thermometer well, and a packed distillation column such that methyl alcohol is permitted to distill from the reactor system, but the EG is refluxed within the system. A weighed amount of zinc acetate dihydrate [$Zn(CH_3CO_2)_2 \cdot 2H_2O$, M.W. 219] and antimony triacetate [$Sb(CH_3CO_2)_3$, M.W. 299] were added to the reaction mixture so as to provide 65 ppm Zn and 230 ppm Sb based on the weight of the DMT fraction. Heat was applied and the temperature of the reaction mixture was permitted to rise as the reaction proceeded and methanol was distilled off. Heat was removed when the theoretical amount of methanol (20.0 moles) had been recovered and the temperature of the reaction mixture had leveled off. Weighed amounts of the ester interchange reaction product were transferred to 500 ml reactor flasks in which the polycondensation reactions were then carried out. Subsequent to transferring the ester interchange reaction product to 500 ml reactor flasks and prior to heating up for the polycondensation reactions, the desired amount of the phosphate ester described earlier in this specification was added to the reaction mixture. (The phosphate ester may be weighed in directly or may be added volumetrically, having first been dissolved in a suitable solvent such as EG, n-butyl alcohol, methanol, etc.) Thus, the phosphate ester was added as a solution in n-butyl alcohol in an amount to provide 31 ppm P based on the weight of the DMT fraction of the ester interchange reaction product. (Other additives of interest such as stabilizers, delusterants, etc., may also be added at this time if desired).

The polycondensation reactor was then heated by immersing in a molten metal bath regulated at 275 ± 2°C., the reactor system having first been flushed with dry nitrogen, and the reactor system was maintained under a dry nitrogen blanket until placed under vacuum.

The polycondensation reactor was equipped with a mechanical stirrer having suitable seals and with a system for condensing and collecting the excess EG removed during the polycondensation reaction and with suitable connections to permit evacuation of the reactor system during the polycondensation reaction. Thus, the polycondensation reactions were run at 275 ± 2°C. and <0.3 mm Hg absolute pressure for sufficient time as to permit the inherent viscosity (I.V.) of the polyester to reach a level of 0.58 or higher. (This time varies depending upon the activity of the catalyst.)

EXAMPLE 2

48 Ti - 62 P (Ti as titanium tetraisopropoxide)

These polymers were prepared by the same procedures as described in Example 1 except that titanium catalyst was used, and the phosphate ester was added at the start of the ester interchange reaction instead of at the end of same. Titanium was added as a solution of titanium tetraisopropoxide [$Ti(OCH(CH_3)_2)_4$, M.W. 284] in n-butyl alcohol in an amount to provide 48 ppm Ti based on the weight of the DMT fraction of the ester interchange reaction mixture. The phosphate ester was added as a solution in n-butyl alcohol in an amount to provide 62 ppm P based on the weight of the DMT fraction of the ester interchange reaction mixture.

EXAMPLE 3

12 Mg - 48 Ti - 62 P Catalyst

These polymers were prepared by the same procedures as described in Example 2 except that a magnesiumtitanium-n-butoxide Meerwein complex was used. The magnesium-titaniumn-butoxide Meerwein complex, prepared as described in U.S. Pat. No. 2,720,502, was added as a solution in n-butyl alcohol in an amount to provide 48 ppm Ti based on the weight of the DMT fraction of the ester interchange reaction mixture.

EXAMPLE 4

48 Ti - 62 P (Ti as acetyl triisopropyl titanate)

Acetyl triisopropyl titanate [$CH_3COO—(OCH(CH_3)_2)_3$, M.W. 284] was prepared by adding slowly with stirring and cooling and under a dry atmosphere glacial acetic acid ($CH_3COOH$, M.W. 60) to titanium tetraisopropoxide in an amount to provide a 1/1 molar ratio of acetic acid/titanium tetraisopropoxide. (The isopropyl alcohol thus displaced by the acetic acid was not removed.) This catalyst may be added to the ester interchange reaction mixture undiluted or as a solution in any of a number of suitable solvents such as n-butyl alcohol, methyl alcohol, ethylene glycol, etc.

Thus, these polymers were prepared by the same procedures as described in Example 2 except that titanium was added as a solution of acetyl triisopropyl titanate (ATIP) in n-butyl alcohol in an amount to provide 48 ppm Ti based on the weight of the DMT fraction of the ester interchange reaction mixture. Abovesaid phosphate ester was added as a solution in n-butyl alcohol in an amount to provide 62 ppm P based on the weight of the DMT fraction of the ester interchange reaction mixture.

Thus the results listed in Table 1 for the above four catalyst systems are averages of three polycondensation reactions run on the product of each of the four ester interchange reactions.

EXAMPLE 5

236 Mn - 374 Sb - 44 P Catalyst

This polymer was prepared by a continuous melt phase process on production scale polyester manufacturing equipment. Thus, maganese benzoate tetrahydrate [$Mn(O_2CC_6H_5)_2 \cdot 4H_2O$, M.W. 369] and antimony triacetate, were metered continuously as solutions, separately or combined in one solution, in a suitable solvent or solvents to said polyester production unit at such a rate as to provide 236 ppm Mn and 374 ppm Sb based on the weight of product polyester. Abovesaid phosphate ester was likewise metered continuously to said production unit at a point after the ester interchange reaction section of said unit as a solution in a suitable solvent and at a rate such as to provide 44 ppm P based on the weight of product polyester.

EXAMPLE 6

50 Mn - 48 Ti - 50 P (Ti as acetyl triisopropyl titanate)

These polymers were prepared as described in Example 1, except that a Mn-Ti-P catalyst system was used. Manganese benzoate tetrahydrate was added as a solution in EG to the ester interchange reaction mixture in an amount to provide 50 ppm Mn based on the weight of the DMT fraction. Acetyl triisopropyl titanate (ATIP) was added as a solution in n-butyl alcohol in an amount to provide 48 ppm Ti based on the DMT fraction of the ester interchange reaction mixture. Abovesaid phosphate ester was added as a solution in EG to the product of the ester interchange reaction in an amount to provide 50 ppm P based on the weight of the DMT fraction of said reaction product and prior to the polycondensation of said product. The polycondensation reactions were run as described in Example 1. Thus, these results are averages of three such polycondensation reactions.

EXAMPLES 7 and 8

50 Mn — 60 Ti — 20 Co — 80 P  
70 Mn — 60 Ti — 20 Co — 80 P  (Ti as ATIP)

These polymers were prepared by running the ester interchange reaction and the polycondensation reaction consecutively in the 500 ml reaction flasks described in Example 1. Thus 116.4 g. (0.6 mole) DMT and 93.0 g. (1.5 moles) EG were placed in said reaction flask. To this mixture was added titanium as ATIP, manganese benzoate tetrahydrate, cobalt acetate tetrahydrate [Co(OOCCH$_3$)$_2$.4HO, M.W. 249], all in separate EG solutions, or alternatively in one combined EG solution in the amounts necessary to provide the indicated levels of catalyst metals based on the weight of the DMT fraction of the said ester interchange reaction mixture. Additionally, the aforesaid phosphate ester was added as a solution in EG in an amount to provide the indicated 80 ppm P based on the weight of the DMT fraction of said ester exchange reaction mixture.

The reactor flask was subsequently immersed a molten metal bath regulated at 195 ± 2°C. with a dry nitrogen atmosphere maintained in the reactor flask, and the ester interchange reaction was run for such time as required to recover the theoretical amount of methyl alcohol (1.2 moles). The temperature of the metal bath was then raised to 275 ± 2°C., the reactor system placed under vacuum, and the polycondensation reaction run as described in Example 1.

Table 2

Thermo-oxidative Stability of PET Made With Various Catalysts

| Example | Catalyst System (ppm[1]) | Thermo-oxidative Stability[2] |
|---|---|---|
| 9 | (100)Ca-(12)Co-(286)Sb-(190)P | 1.000* |
| 10 | (99)Zn-(217)Sb-(281)P | 2.89** |
| 11 | (53)Mn-(353)Sb-(170)P | 1.876 |
| 12 | (76)Mn-(132)Sb-(25)P | 1.323 |
| 13 | (119)Mn-(10)Co-(292)Sb-(170)P | 1.278 |
| 14 | (113)Mn-(35)Co-(269)Sb-(130)P | 1.043 |
| 15 | (15)Mg-(60)Ti-(120)P | 3.103 |
| 16 | (50)Mn-(60)Ti-(20)Co-(80)P[3] | 0.930 |

*Standard to which all other results are normalized.
**Normalized percent crosslinker (thermo-oxidation product). Percent crosslinker correlates with percent weight loss (see 2). Ref. TERL-72-5255-500 (1972)
[1]Ppm metal based on wt. of polymer.
[2]Percent weight loss of pressed films after 6 hours at 300°C. in air circulating oven. All results are normalized by dividing percent weight lost by the percent weight lost by the standard.
[3]Ti as acetyl triisopropyl titanate.

The poly(ethylene terephthalate)s set forth in Examples 9-16 in Table 2 were prepared as follows:

EXAMPLE 9

100 Ca - 12 Co - 286 Sb - 190 P

This polymer was a commercially available product manufactured by Teijin, Ltd. and used as an arbitrary standard in thermo-oxidative stability studies.

EXAMPLE 10

99 Zn - 217 Sb - 281 P

This polymer was produced as described in Example 5, except that the phosphate ester was added by blending 50.0 g. of the polymer pellets with the required amount of phosphate ester in 25 ml. of dry benzene (C$_6$H$_6$. M.W. 78) to provide 281 ppm of P based on the weight of polyester. The benzene was then evaporated off under vacuum, and the coated pellets dried and then extruded on a Brabender Plasticorder to obtain homogeneous mixing of the said phosphate ester.

EXAMPLE 11

53 Mn - 353 Sb - 170 P

This polymer was prepared using procedures described in Example 1.

EXAMPLE 12

76 Mn - 132 Sb - 25 P

This polymer was produced as described in Example 5.

EXAMPLES 13 and 14

119 Mn - 10 Co - 292 Sb - 170 P

113 Mn - 35 Co - 269 Sb - 130 P

These polymers were prepared as described in Example 7 except that the phosphate ester was coated on the polymer as follows: the polymer was ground through a 2 mm screen and then 20 g. were blended with a sufficient amount of said phosphate ester in 50 ml of dichloromethane (CH$_2$Cl$_2$, M.W. 85) to give the indicated levels of P (ppm based on the weight of polyester). The dichloromethane was then evaporated off under vacuum.

EXAMPLE 15

15 Mg - 60 Ti - 120 P

This polymer was produced by a continuous melt phase process described in Example 5.

EXAMPLE 16

50 Mn - 60 Ti - 20 Co - 80 P

This polymer was prepared as described in Example 7.

EXAMPLE 17

To illustrate the effect on production rate of the catalyst inhibitor system of this invention the following comparisons are made between the system of this invention (Mn-Ti-Co-P) and a Mg-Ti-n-butoxide system and a Mn-Mg-Ti-Sb system. The average rate improvement is about 3–10%. The change in maximum production rate obtained when switching from systems known to the Mn-Ti-Co-P system of the invention (items A, B, and C of Table 3) or vice versa (items D and E of Table 3) is shown in Table 3 below.

Table 3

| | Catalyst System | Percent Change in Max. Rate |
|---|---|---|
| A | 12 Mg-48 Ti-n-Butoxide | — |
| | 55 Mn-60 Ti-20 Co-80 P. | + 7.2% |
| B | 55 Mn-6 Mg-25 Ti-200 Sb-50 P | — |

Table 3-Continued

| | Catalyst System | Percent Change in Max. Rate |
|---|---|---|
| | 55 Mn-60 Ti-20 Co-80 P | +3.4% |
| C | 55 Mn-6 Mg-25 Ti-200 Sb-50 P | — |
| | 55 Mn-60 Ti-20 Co-80 P | +26.9% |
| D | 55 Mn-60 Ti-20 Co-80 P | — |
| | 12 Mg-48 Ti-n-Butoxide | −3.7% |
| E | 55 Mn-60 Ti-20 Co-80 P | — |
| | 55 Mn-6 Mg-25 Ti-200 Sb-50 P | −21.6% |

Although the invention has been described in considerable detail with particular reference to certain preferred embodiments thereof, variations and modifications can be effected within the spirit and scope of the invention.

We claim:

1. Process of producing polyethylene terephthalate comprising reacting dimethyl terephthalate and ethylene glycol at a temperature sufficient to effect ester interchange and in the presence of a catalyst system comprising a mixture of salts of manganese and cobalt with acetyl triisopropyl titanate, the manganese salts being present in the amount of 35–110 ppm Mn, the cobalt salts being present in the amount of 5–35 ppm Co and the acetyl triisopropyl titanate being present in the amount of 36–72 ppm Ti, all parts by weight based on the acid fraction of the polyester.

2. Process of claim 1 wherein the said manganese salt is manganous benzoate tetrahydrate and the cobalt salt is cobaltous acetate tetrahydrate.

3. Process of claim 1 wherein a phosphate ester is added to the reaction product of the ester interchange and said reaction product is polycondensed, said phosphate ester having the formula

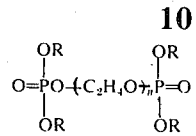

wherein $n$ has an average value of about 1.5 to about 3.0 and each R is hydrogen or an alkyl radical having from 6 to 10 carbon atoms, the ratio of the number of R groups of hydrogen atoms to the number of phosphorus atoms being about 0.25 to 0.50, and the ester has a free acidity equivalent of about 0.2 to 0.5, said ester being present in the amount of 550–1600 ppm based on the acid fraction of the polyester.

4. Process of claim 2 wherein a phosphate ester is added to the reaction product of the ester interchange and said reaction product is polycondensed, said phosphate ester having the formula

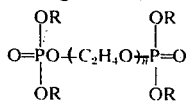

wherein $n$ has an average value of about 1.5 to about 3.0 and each R is hydrogen or an alkyl radical having from 6 to 10 carbon atoms, the ratio of the number of R groups of hydrogen atoms to the number of phosphorus atoms being about 0.25 to 0.50, and the ester has a free acidity equivalent of about 0.2 to 0.5, said ester being present in the amount of 550–1600 ppm based on the acid fraction of the polyester.

5. Process of claim 4 wherein n is about 1.8, R is hydrogen or octyl and the ratio of the number of R hydrogen atoms to the number of phosphorus atoms is about 0.35.

6. Process of claim 5 wherein said phosphate ester has a molecular weight of 771 and the composition is as follows: C = 52.84%; H = 9.98%; P = 8.04%; and O = 29.14% by weight.

* * * * *